United States Patent [19]

Murakami et al.

[11] 4,421,635

[45] Dec. 20, 1983

[54] PROCESS FOR SIMULTANEOUSLY CRACKING HEAVY HYDROCARBONS INTO LIGHT OILS AND PRODUCING HYDROGEN

[75] Inventors: Tadashi Murakami, Kurashiki; Teruo Suzuka, Toda; Yukio Inoue, Toda; Shirou Aizawa, Toda, all of Japan

[73] Assignee: Research Association for Residual Oil Processing, Tokyo, Japan

[21] Appl. No.: 348,542

[22] Filed: Feb. 12, 1982

[30] Foreign Application Priority Data

Feb. 13, 1981 [JP] Japan ................................. 56-20708

[51] Int. Cl.$^3$ ....................... C10G 47/04; C10G 11/04
[52] U.S. Cl. ................................... 208/112; 208/121; 502/38
[58] Field of Search ............................... 208/121, 112

[56] References Cited

U.S. PATENT DOCUMENTS

| | | | |
|---|---|---|---|
| 2,694,622 | 11/1954 | Reed et al. ............................. | 208/97 |
| 4,298,460 | 11/1981 | Fujimori et al. ...................... | 208/121 |
| 4,308,173 | 12/1981 | Fujimori et al. ...................... | 208/120 X |
| 4,325,812 | 4/1982 | Fujimori et al. ...................... | 208/119 |
| 4,334,920 | 6/1982 | Mori et al. ............................ | 208/124 |

*Primary Examiner*—Delbert E. Gantz
*Assistant Examiner*—D. Chaudhuri
*Attorney, Agent, or Firm*—Sughrue, Mion, Zinn, Macpeak, and Seas

[57] ABSTRACT

A process for simultaneously cracking a heavy hydrocarbons to form light oil and producing hydrogen is described, which comprises (1) a first step wherein steam and heavy hydrocarbons are simultaneously contacted with a catalyst in a reduced state, containing iron in the form of iron oxide, to produce hydrogen, cracked gases and cracked light oils, to convert the reduced-state catalyst into an oxidized-state catalyst, and to deposit coke on the catalyst, (2) a second step wherein the oxidized-state catalyst with coke deposited thereon is contacted with an oxygen-containing gas to partially combust the coke on the catalyst, to convert the oxidized-state catalyst into a reduced-state catalyst, and to fix a sulfur compound contained in the coke as iron sulfide with a part of the reduced-state catalyst; and (3) a third step wherein catalyst obtained from the second step, the major portion of the catalyst being recycled between the first step and second step, is contacted with an oxygen-containing gas at a temperature of from 600° to 1,000° C. to effect roasting and gasification of iron sulfide in the catalyst.

4 Claims, 1 Drawing Figure

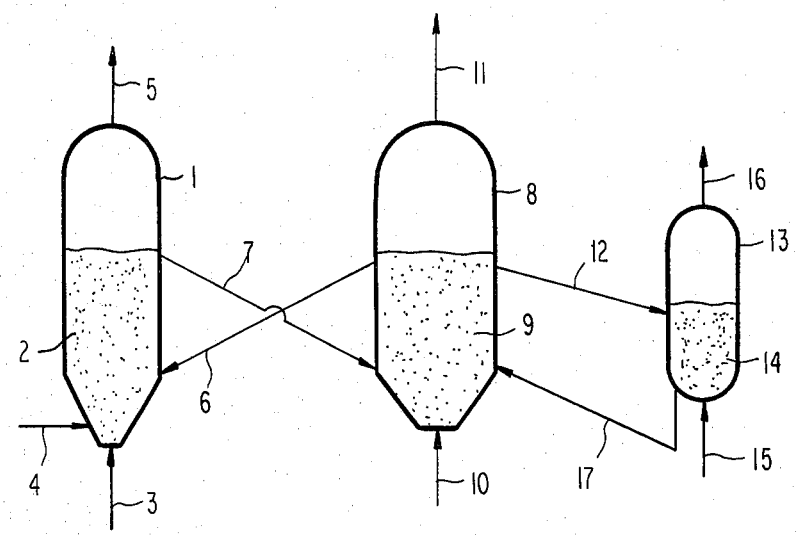

PROCESS FOR SIMULTANEOUSLY CRACKING HEAVY HYDROCARBONS INTO LIGHT OILS AND PRODUCING HYDROGEN

FIELD OF THE INVENTION

The present invention relates to a process for simultaneously cracking heavy hydrocarbons to form light oils and producing hydrogen. More particularly, it relates to a process for producing hydrogen, cracked gases, and cracked light oils by contacting steam and heavy hydrocarbons simultaneously with catalyst particles containing iron in a reduced state.

BACKGROUND OF THE INVENTION

Some of the present inventors have previously proposed a process for catalytically cracking vacuum residual oil and other heavy hydrocarbons into light oils in the presence of a laterite catalyst, wherein the coke deposited on the catalyst is combusted in a reducing atmosphere to reduce the iron oxide in the catalyst, and then the reduced catalyst is contacted with steam to produce hydrogen (see U.S. Pat. Nos. 4,224,140 and 4,298,460).

As a result of further extensive study on the foregoing process, it has been found that when a catalyst containing iron in a reduced state is used, a reaction involving cracking of heavy hydrocarbons into cracked gases and light oils and coking and a steam-iron reaction of iron in a reduced state and steam simultaneously proceeds even at relatively low temperature, e.g., 500° to 600° C.

On the basis of the foregoing findings, some of the inventors further proposed a simplified process for simultaneously cracking heavy hydrocarbons into cracked gases and light oils and producing hydrogen, comprising a first step wherein steam and heavy hydrocarbons are simultaneously contacted with a catalyst containing iron in a reduced state to produce hydrogen, cracked gases, and cracked light oils and at the same time, to effect oxidation of the iron in a reduced state, contained in the catalyst and deposition of coke on the catalyst, and a second step wherein the catalyst containing iron in an oxidized state, with the coke deposited thereon, is contacted with an oxygen-containing gas insufficient for achieving complete combustion of the coke, to partially combust the coke on the catalyst and simultaneously reduce the oxidized iron in the catalyst, thus regenerating the catalyst (see U.S. Pat. No. 4,325,812, filed Sept. 29, 1980).

This process is hereinafter explained in detail.

This catalyst used in the process can be prepared by pulverizing, kneading, granulating and calcining materials having a very high iron content, such as natural ores containing iron in the form of hydroxide, oxide or carbonate (e.g., laterite, magnetite, siderite, limonite and hematite), or chemical compositions of iron oxides, hydroxides or carbonates, or mixtures thereof with inorganic materials, such as alumina, silica, magnesia, calcium hydroxide, and nickel oxide, and natural ores, e.g., garnierite, dolomite and limestone. To have high catalytic activity, these catalyst particles preferably have a specific surface area of from 0.1 to 30 m²/g, and for use in a fluidized bed, the catalyst particles preferably have a mean diameter of from 60 to 600μ. When the iron (Fe) content of the catalyst is below 30% by weight, only a small amount of hydrogen can be produced. It is, therefore, essential for the catalyst to contain at least 30% by weight Fe. The Fe content preferably does not exceed 70% by weight because otherwise bogging (i.e., sintering and agglomeration of catalyst particles) occurs during the reduction of the catalyst in the second step.

The terms "in an oxidized state" and "in a reduced state" are used herein as a relative measure of the degree of reduction of iron oxides in the catalyst particles. The degree of reduction (R) of the catalyst particles can be represented by the following formula:

$$R = \left[ 1 - \frac{\text{gram-atoms of oxygen combined with the Fe in the catalyst}}{3/2 \times (\text{gram-atoms of Fe in the catalyst})} \right] \times 100\%$$

If $R_1$, which is the degree of reduction of the catalyst at the end of the first step, is smaller than $R_2$, which is the degree of reduction of the catalyst at the end of the second step, the invention achieves its object, and the greater the difference between $R_2$ and $R_1$, the greater the amount of hydrogen that will be generated per given amount of catalyst recycled to the first step. In this process, therefore, a catalyst having a degree of reduction of $R_1$ is referred to as a catalyst in an oxidized state (or as an oxidized-state catalyst), whereas the catalyst having a degree of reduction of $R_2$ is referred to as a catalyst in a reduced state (or as a reduced-state catalyst). Both $R_1$ and $R_2$ are preferably greater than 11.1%; $R_2$ is preferably in the range of from 12 to 50%, and more preferably in the range of from 15 to 40%.

Hereinafter the process will be explained in further detail with reference to the accompanying drawing.

In the first step 1 of the process, a catalyst bed 2 composed of catalyst particles in a reduced state, which are introduced thereinto through a catalyst transfer pipe 6, is maintained at a temperature of from 500° to 800° C. and a pressure (gauge pressure) of from 0 to 15 kg/cm², and steam 3 and heavy hydrocarbons 4 are introduced into the catalyst bed 2 from the bottom thereof to form a fluidized bed where the steam-iron reaction (a reaction to generate hydrogen by contacting steam with iron (Fe) or iron oxide (FeO)) and simultaneously cracking heavy hydrocarbons are performed.

Heavy hydrocarbons which can be cracked to light oils with advantage by the process include relatively inexpensive high-boiling residual oils having more than 10% by weight Conradson carbon such as atmospheric residual oil, vacuum residual oil, solvent-deasphalting residues, tar sand, and shale oil.

The steam introduced into the catalyst bed causes the steam-iron reaction with the iron in a reduced state (i.e., Fe or FeO), contained in the catalyst, generating hydrogen and at the same time, oxidizing the iron in the catalyst into iron oxides (i.e., FeO or $Fe_3O_4$). The heavy hydrocarbons are catalytically cracked into cracked gases, cracked light oils and coke. The thus-formed coke deposits on the surface of the catalyst particles.

About 30 to 50% of the sulfur contained in the heavy hydrocarbons is distributed into the coke. The amount of the coke deposited on the catalyst increases with the content of Conradson carbon in the heavy hydrocarbons and with the progress of the cracking reaction. For the purpose of the process, the amount of the coke deposited is preferably from 2 to 15% by weight, and more preferably from 4 to 12% by weight, based on the weight of the catalyst. If the amount of the coke deposited is too small, the iron oxides in the catalyst are not reduced adequately in the second step 8, and to provide a good heat balance for the reaction system, additional heat must be supplied in great quantity from an external source. On the other hand, if the amount of the coke deposited on the catalyst is too high, the catalytic activity of the catalyst is decreased and the reaction between the steam and the reduced-state iron is inhibited to decrease the amount of hydrogen generated.

Catalyst in a reduced state is converted into catalyst in an oxidized state by the steam. At this time, a part of iron sulfide present in the catalyst, i.e., iron sulfide resulting from the reaction of sulfur with Fe, FeO or $Fe_3O_4$ at the second step 8, is converted into iron oxides and hydrogen sulfide. It is, however, not desirable from an economic standpoint to decompose all the iron sulfide resulting from the reaction because to do so requires a large quantity of steam. The coke on the catalyst reacts with steam to a slight extent to generate hydrogen, carbon monoxide, and carbon dioxide, but this reaction is insignificant at a temperature lower than 800° C.

The amount of heavy hydrocarbons supplied to the first step is properly determined depending on the amount of coke deposited and the amount of catalyst particles recycled to the first step, and the amount of steam supplied is properly selected depending on the degree of reduction of the catalyst, the desired amount of hydrogen generated, and the amount of catalyst particles recycled to the first step.

Hydrogen, hydrogen sulfide, cracked gases such as methane, ethane, ethylene, $C_3$ fractions, and $C_4$ fractions, and cracked oils generated in the first step, and uncracked heavy hydrocarbons, steam and so forth are discharged from the top 5 of the first step 1 in the form of a gas and vapor. The thus discharged gas is introduced into a scrubbing column or a distillation column (not shown) where it is first separated into uncracked heavy hydrocarbons and cracked products. The uncracked heavy hydrocarbons are returned and mixed with a feedstock, heavy hydrocarbons, and again subjected to the cracking reaction. The hydrogen, cracked gases, cracked light oil and so forth are separated and recovered by known refining steps as a gaseous mixture which contains hydrogen as the major component, and, additionally, methane, ethane, ethylene, $C_3$ fractions, $C_4$ fractions, and hydrogen sulfide ($H_2S$). This gaseous mixture can be separated into high purity hydrogen and hydrogen sulfide, and propane, butane and other light hydrocarbon gases by suitable means, such as distillation, an amine absorption method, a pressure swing adsorption method [PSA method (see, for example, CEP, January (1976), pp. 44-49)] and a cryogenic processing [see, for example, CEP, September (1969), pp. 78-83], which may be used alone or in combination with each other. For example, the mixture can first be freed of $C_3$ and $C_4$ fractions by distillation or absorption, then freed of $H_2S$ by amine absorption, and then freed of hydrogen and light hydrocarbon gases such as methane, ethane, and ethylene by the pressure swing adsorption method or cryogenic processing.

The cracked light oil is fed to the refining step where it is separated into a naphtha fraction, a kerosine fraction, a gas oil fraction, etc., which are desulfurized in a desulfurization step to provide the desired end products.

The oxidized-state catalyst with the coke formed in the first step deposited thereon is transferred to a second step 8 through a transfer pipe 7. A catalyst bed 9 is maintained in a fluidized state by introducing thereinto an oxygen-containing gas 10, e.g., air. The coke deposited on the catalyst is partially combusted with oxygen insufficient for complete combustion of the coke. The catalyst bed 9 is maintained at a temperature of from 750° to 950° C. and a pressure of from 0 to 15 kg/cm$^2$G, and is held in a reducing atmosphere produced by CO gas generated by partial combustion of the coke. The amount of oxygen in the oxygen-containing gas is preferably such that the mole ratio of oxygen supplied to coke deposited on the catalyst (coke supplied from the transfer pipe 7) ($O_2/C$) is from 0.1 to 0.6, with the range of from 0.2 to 0.4 being particularly preferred.

The coke deposited and CO gas generated by partial combustion of coke react with the catalyst in an oxidized state in the catalyst to form the catalyst in a reduced state. That is, the iron oxide in the catalyst is reduced. The residence time of each of the catalyst and gas, the amount of coke deposited, the amount of oxygen being introduced, and so forth are properly determined so that the degree of reduction of the catalyst is maintained in the above described range of from 12 to 50%.

The coke deposited on the catalyst reacts with the oxygen in the oxygen-containing gas and the oxygen in the catalyst to form gases such as carbon monoxide (CO) and carbon dioxide ($CO_2$). Simultaneously, sulfur compounds contained in the coke are gasified into $H_2S$, COS, $SO_x$, etc. These gaseous sulfur compounds are captured by Fe, FeO and $Fe_3O_4$ in the reduced-state catalyst and are converted into iron sulfide. Therefore, the sulfur content of a large quantity of waste gas 11 discharged from the second step can be significantly reduced.

As the reaction temperature is increased (e.g., more than 750° C.), the above described reactions such as partial combustion of coke, reduction of catalyst, and capture of sulfur proceed faster. It is preferred, however, that the reaction temperature does not exceed 950° C., because otherwise bogging occurs among catalyst particles, undesirably making the fluidization and transfer of catalyst to another step difficult. It is, therefore, preferred to perform the reaction at a temperature between 750° C. and 950° C. The temperature can be maintained in this range by the partial combustion of coke. It is to be understood that to avoid the possibility that the heat balance in the reaction system may be upset, the system may be cooled or heated by a conventional external or internal means. For example, cooling can be achieved simply using a boiler type fluidized bed, and for heating, it is convenient to use a method in which torch oil (which may be the same as or different from the heavy hydrocarbon feedstock) is supplied directly to the catalyst bed 9. The amount of heat generated in the reaction system can also be controlled by changing the amount of oxygen in the oxygen-containing gas 10, although care must be taken so that the mole ratio of $O_2/C$ is kept within the above defined range.

The waste gas 11 resulting from the reduction reaction and partial combustion of coke is generally discharged from step 8, e.g, after recovery of differential pressure energy by means such as a conventional gas expander, and of heat energy by means such as a conventional CO boiler, it is discharged outside the reaction system. Irrespective of the fact that the coke having a high sulfur content is burned with air, for example, the sulfur content of the resulting waste gas 11 is low, since the reduced-state catalyst in step 8 has the action of fixing sulfur compounds as iron sulfide. It is therefore possible to discharge the waste gas directly into the atmosphere without application of a desulfurization treatment.

The catalyst freed of coke and rendered to a reduced state is returned to the first step through a catalyst transfer pipe 6. In accordance with the process, while effecting reduction and regeneration of the catalyst simultaneously with combustion and gasification of coke in a high temperature reducing atmosphere, the sulfur compounds which are distributed in the coke during the cracking reaction of heavy hydrocarbons and the coking reaction, react with the iron in the catalyst, forming iron sulfide. It has been found, however, that when the catalyst is used while recycling for a long period of time, iron sulfide gradually accumulates in the catalyst, causing the problem that the amount of hydrogen generated is reduced.

In order to prevent the accumulation of iron sulfide, it has been proposed to use a method of converting iron sulfide into hydrogen sulfide and iron oxide with steam. This method, however, is not always economically advantageous because it needs a large amount of steam because of the equilibrium of reaction.

SUMMARY OF THE INVENTION

The object of the invention is to provide a process which overcomes the above described defects and permits the cracking of heavy hydrocarbons into light oils and the production of hydrogen industrially very advantageously.

The present invention, therefore, provides a process for simultaneously cracking heavy hydrocarbons to form light oils and producing hydrogen, which comprises:

a first step wherein steam and heavy hydrocarbon are simultaneously contacted with a catalyst in a reduced state, containing at least 30% by weight iron (Fe) in the form of iron oxide, at a temperature of from 500° to 800° C. to produce hydrogen, cracked gases, and cracked light oils, to convert the reduced-state catalyst into an oxidized-state catalyst, and to deposit coke on the catalyst; and a second step wherein the oxidized-state catalyst with the coke deposited thereon is contacted with an oxygen-containing gas insufficient for achieving complete combustion of the coke, at a temperature of from 750° to 950° C. to partially combust the coke on the catalyst, to convert the oxidized-state catalyst into a reduced-state catalyst, and to fix sulfur compounds contained in the coke as iron sulfide with a part of the reduced-state catalyst, wherein the improvement comprises that:

(1) a major portion of the catalyst is recycled between the first step and second step; and (2) there is provided a third step wherein a part of the reduced-state, iron sulfide-containing catalyst formed in the second step is contacted with an oxygen-containing gas at a temperature of from 600° to 1,000° C. to effect roasting and gasification of iron sulfide in the catalyst, the catalyst after roasting and gasification being recycled to the second step or the first step, or to both the second and first steps.

BRIEF DESCRIPTION OF THE DRAWING

The drawing is a schematic illustration of an embodiment of the process of the invention.

DETAILED DESCRIPTION OF THE INVENTION

The reference to "a catalyst containing at least 30% by weight iron (Fe)" as used herein assumes that the catalyst has been prepared by suitable means such as calcination in a conventional oxidizing atmosphere; thus the term refers to a catalyst which, when most of iron in the catalyst is in the form of $Fe_2O_3$, contains at least 30% by weight of iron (Fe).

The first step and second step of the process of the invention are as described hereinbefore.

In addition to the first step and second step, the process of the invention further includes a third step wherein roasting and gasification of iron sulfide in the catalyst formed in the second step 8 is performed. The catalyst to be supplied to the third step may be the catalyst which is reduced and regenerated in the second step 8. If the catalyst from the first step is introduced into the third step, combustion of coke on the catalyst occurs, and this leads to a decrease in the degree of reduction of the catalyst in the second step 8 due to decrease in the amount of coke attached to the catalyst fed to the second step and then, to a reduction in the amount of hydrogen formed at the first step 1.

The process of the invention is hereinafter described in detail with reference to the drawing schematically illustrating an embodiment thereof wherein the catalyst is recycled between the second step and third step.

Also, the catalyst which has been subjected to the roasting and gasification treatment at the third step can be returned to the first step with the same results.

As described above, a major portion of the catalyst is recycled between the first step 1 and the second step 8, and a part of the catalyst is introduced into the third step 13 through a pipe 12. In the third step 13, a catalyst bed 14 is a fluidized bed which is formed by an oxygen-containing gas (e.g., air) and/or steam 15 at a temperature of from 600° to 1,000° C. and a pressure of from 0 to 15 $kg/cm^2G$. Into the catalyst bed 14 the oxygen containing gas (or a mixture thereof with steam) is introduced in a quantity sufficient for combustion of iron sulfide in catalyst particles formed in the second step to produce iron oxide and gaseous sulfur compounds. The amount of oxygen or mixture of oxygen and steam in the gas introduced is properly determined depending on the amount of iron sulfide in the catalyst particles, the amount of residual coke on the catalyst, and the amount of the catalyst recycled. It is preferred, however, that the combustion is performed by a method which permits the coke deposited on the catalyst to remain in as large an amount as possible. The reason for this is that the coke on the catalyst contributes to the above described reduction of iron oxide in the second step, and therefore to the formation of hydrogen.

The rate of oxidative roasting of iron sulfide and the rate of combustion of coke markedly vary depending on the temperature and the amount of oxygen introduced. For example, when the amount of oxygen introduced at a roasting temperature of 700° C. is 70 mole% of the theoretical oxygen amount for complete combustion of ion sulfide and coke, percent desulfurization of iron sulfide is about 72% by weight, whereas percent combustion of coke is only 35% by weight. If the roasting temperature is raised to 800° C., percent desulfurization of iron sulfide is increased only slightly, i.e., to about 75% by weight, whereas percent combustion of coke is increased to about 53% by weight. Moreover, if the amount of oxygen introduced is increased to 100 mole% of the theoretical oxygen amount for complete combustion, percent desulfurization of iron sulfide is about 85% by weight and percent combustion of coke is about 70% by weight, at a roasting temperature of 700° C.

In the third step as described above, it is preferred to perform the roasting at a relatively low temperature and in a reducing atmosphere for the prevention of loss of coke. Particularly preferably the roasting is performed at a temperature of from 600° to 800° C., with an amount of oxygen introduced of from 60 to 100 mole% of the theoretical oxygen amount for complete combustion of iron sulfide and coke.

Admixture of steam with the oxygen-containing gas permits the conversion a part of the sulfur of iron sulfide into hydrogen sulfide. This is advantageous for the recovery of sulfur compounds in the waste gas from the third step 13 as elemental sulfur.

The amount of the catalyst fed to the third step is determined depending on the sulfur content of the heavy hydrocarbons. That is, as described above, the sulfur compounds in the hydrocarbons which have been distributed into the coke are fixed as iron sulfide in the second step. The fixed iron sulfide is gradually accumulated in the catalyst while the catalyst is recycled. Thus, the amount of the catalyst recycled and roasted in the third step can be proportional to the amount of iron sulfide produced, and can be mainly determined by the sulfur content of heavy hydrocarbons. For example, even when the sulfur content of the heavy hydrocarbon feed is about 5 wt%, it is sufficient to recycle about 10 wt% of the catalyst recycled between the first step 1 and the second step 8 to the third step 13.

The catalyst which has been roasted is returned to the second step 8 through a pipe 17 and/or to the first step 1 (the transfer pipe is not shown).

The waste gas 16 from the third step 13 contains hig concentrations of gaseous sulfur compounds, e.g., $SO_x$, and after desulfurization with a sulfur recovery apparatus utilizing a combination of the Clauss reaction and Scott reaction, a sulfuric acid production system, and other usual desulfurization apparatus, is discharged outside the system.

As discussed in the foregoing, the process of the invention permits the advantageous production of cracked light oils and hydrogen by catalytic cracking of inexpensive heavy hydrocarbons, and at the same time, the collection of 30 to 50% of the sulfur in the heavy hydrocarbon feed as high concentration gaseous sulfur compounds which can be easily recovered. Thus the process of the invention is industrially very useful.

Below Example and Comparative Example are described to illustrate the invention in greater detail. In these Examples, the symbol "N" used for "Nl" and "Nm³" means that the volume indicated is at standard pressure and temperature.

EXAMPLE

Cracking was continuously performed while recycling the catalyst according to the flow diagram shown in the drawing.

Steps

First Step:
 A cracking column made of stainless steel; inner diameter; 12.7 cm; height: 160 cm
Second Step:
 A regenerating column made of stainless steel; inner diameter: 15.1 cm; height: 180 cm
Third Step:
 A roasting column made of stainless steel; inner diameter: 5.0 cm; height: 100 cm

| Feedstock | |
|---|---|
| Kuwait Vacuum Residual Oil | |
| Specific Gravity (15° C./4° C.) | 1.020 |
| Residual Carbon (wt %) | 21.1 |
| Sulfur (wt %) | 5.1 |

Catalyst

A laterite ore containing 55.1 wt% Fe, 1.26 wt% Ni, 2.6 wt% MgO, 4.7 wt% $SiO_2$, and 2.81 wt% $Al_2O_3$ was ground, kneaded, granulated, and calcined at 1,160° C. for 3 hours to make catalyst particles. The catalyst had a mean diameter of 0.2 mm and a specific surface area of 3.2 $m^2/g$.

| Operation Conditions | |
|---|---|
| Cracking Column: | |
| Catalyst | 13 kg |
| Feedstock Supplied | 4.0 kg/hr |
| Steam Supplied | 2.0 kg/hr |
| Temperature | 540° C. |
| Pressure | 1 kg/cm² G |
| Regenerating Column: | |
| Catalyst | 20 kg |
| Air Supplied | 2.5 Nm³/hr |
| Feedstock Supplied | 0.06 kg/hr |
| Temperature | 850° C. |
| Pressure | 1 kg/cm² G |
| Roasting Column: | |
| Catalyst | 1.0 kg |
| Air Supplied | 0.5 Nm³/hr |
| Temperature | 750° C. |
| Pressure | 1 kg/cm² G |
| Catalyst Recycled | |
| Between Cracking Column and Regenerating Column | 20 kg/hr |
| Between Regenerating Column and Roasting Column | 1 kg/hr |

The cracking was performed stably for a long period of time under the foregoing conditions. During the operation, a sample was taken at each step and analyzed. The results obtained are shown in Table 1 below.

TABLE 1

| Cracking Column | |
|---|---|
| Yield of Gas (dry base) | 842.7 Nl/hr |
| Gas Composition | |
| $H_2$ | 71.2 vol % |
| $H_2S$ | 1.3 vol % |
| $CH_4$ | 10.9 vol % |
| $C_2$ Fraction | 7.8 vol % |
| $C_3$ Fraction | 4.7 vol % |
| $C_4$ Fraction | 2.4 vol % |
| Yield of Naphtha Fraction | 4.0 wt % |
| Yield of Kerosine Fraction | 2.6 wt % |
| Yield of Gas Oil Fraction | 2.9 wt % |
| Yield of Vacuum Gas Oil Fraction | 26.4 wt % |
| Yield of Coke | 13.1 wt % |
| Cracking Ratio of Feedstock | 61.4 wt % |
| Regenerating Column | |
| Gases Generated | 3.1 Nm³/hr |
| Gas Composition | |
| CO | 17.6 vol % |
| $CO_2$ | 15.8 vol % |

TABLE 1-continued

| | |
|---|---|
| $H_2S + SO_x$ | 94.9 ppm |
| Roasting Column | |
| Gases Generated | 0.45 Nm³/hr |
| Concentration of $SO_x$ in Gas | 7.7 vol % |

COMPARATIVE EXAMPLE

Cracking was performed in the same manner as described in Example but eliminating the roasting column in the third step. The feedstocks, columns, operation conditions and catalyst used were the same as those used in the first and second steps of Example.

After operation for 50 hours, a sample was taken at each step and analyzed. The results obtained are shown in Table 2 below.

TABLE 2

| | |
|---|---|
| Cracking Column | |
| Yield of Gas (dry base) | 710 Nl/hr |
| Gas Composition | |
| $H_2$ | 67.6 vol % |
| $H_2S$ | 1.5 vol % |
| $CH_4$ | 13.1 vol % |
| $C_2$ Fraction | 9.0 vol % |
| $C_3$ Fraction | 5.8 vol % |
| $C_4$ Fraction | 3.0 vol % |
| Yield of Naphtha Fraction | 5.8 wt % |
| Yield of Kerosine Fraction | 2.5 wt % |
| Yield of Gas Oil Fraction | 3.2 wt % |
| Yield of Vacuum Gas Oil Fraction | 25.9 wt % |
| Yield of Coke | 14.1 wt % |
| Cracking Ratio of Feedstock | 59.0 wt % |
| Regenerating Column | |
| Gases Generated | 3.3 Nm³/hr |
| Gas Composition | |
| CO | 16.4 vol % |
| $CO_2$ | 17.2 vol % |
| $H_2S + SO_x$ | 120 ppm |

As apparent from the results shown in Table 2, the yield of hydrogen gas is reduced by about 20% as compared with the yield in Example. This is due to the accumulation of iron sulfide in the catalyst.

While the invention has been described in detail and with reference to specific embodiments thereof, it will be apparent to one skilled in the art that various changes and modifications can be made therein without departing from the spirit and scope thereof.

What is claimed is:

1. A process for simultaneously cracking heavy hydrocarbons to form light oils and producing hydrogen, which comprises a first step wherein steam and heavy hydrocarbons are simultaneously contacted with a catalyst in a reduced state, containing at least 30% by weight iron in the form of iron oxide, at a temperature of from 500° to 800° C., to produce hydrogen, cracked gases, and cracked light oils, to convert the reduced-state catalyst into an oxidized-state catalyst, and to deposit coke on the catalyst, and a second step wherein the oxidized-state catalyst with the coke deposited thereon is contacted with an oxygen-containing gas insufficient for achieving complete combustion of the coke, at a temperature of from 750° to 950° C., to partially combust the coke on the catalyst, to convert the oxidized-state catalyst into a reduced-state catalyst, and to fix a sulfur compound contained in the coke as iron sulfide with a part of the reduced-state catalyst, wherein the improvement comprises that:

(1) a major portion of the catalyst is recycled between the first step and second step; and (2) there is provided a third step wherein a part of the reduced-state, iron sulfide-containing catalyst formed in the second step is contacted with an oxygen-containing gas in a reducing atmosphere at a temperature of from 600° to 1,000° C. to effect combustion of iron sulfide in the catalyst, the catalyst after combustion being recycled to the second step or the first step, or to both the second and first steps.

2. A process as in claim 1, wherein the oxygen-containing gas supplied to the third step contains steam.

3. A process as in claim 1, wherein the temperature in the third step is from 600° to 800° C.

4. A process as in claim 1, wherein the quantity of oxygen in the oxygen-containing gas supplied to the third step is from 600 to 100 mole% of the theoretical amount necessary for complete combustion of the iron sulfide and coke.

* * * * *

UNITED STATES PATENT AND TRADEMARK OFFICE
CERTIFICATE OF CORRECTION

PATENT NO. : 4,421,635

DATED : December 20, 1983

INVENTOR(S) : Murakami et al

It is certified that error appears in the above-identified patent and that said Letters Patent is hereby corrected as shown below:

Claim 4, line 3 change "600 to 100 mole%" to --60 to 100 mole%--.

Signed and Sealed this

Twenty-sixth Day of March 1985

[SEAL]

Attest:

DONALD J. QUIGG

Attesting Officer     Acting Commissioner of Patents and Trademarks